US007852595B2

(12) United States Patent  
Kitahori et al.

(10) Patent No.: US 7,852,595 B2
(45) Date of Patent: Dec. 14, 2010

(54) MAGNETIC DISK UNIT AND MANUFACTURING METHOD THEREOF

(75) Inventors: Hiroki Kitahori, Kanagawa (JP); Kyo Akagi, Tokyo (JP); Takayuki Honda, Kanagawa (JP); Yasuo Kojima, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 38 days.

(21) Appl. No.: 12/290,361

(22) Filed: Oct. 29, 2008

(65) Prior Publication Data
US 2009/0135517 A1 May 28, 2009

(30) Foreign Application Priority Data
Nov. 28, 2007 (JP) ............................. 2007-307058

(51) Int. Cl.
*G11B 21/02* (2006.01)
*G11B 33/14* (2006.01)
(52) U.S. Cl. .................................. 360/75; 360/97.02
(58) Field of Classification Search ................... None
See application file for complete search history.

(56) References Cited

U.S. PATENT DOCUMENTS

| 4,307,425 | A | * | 12/1981 | Kaneko et al. ............ 360/97.03 |
| 6,934,116 | B2 | | 8/2005 | Iwashiro |
| 6,999,262 | B2 | * | 2/2006 | Han et al. ...................... 360/75 |
| 7,035,034 | B2 | | 4/2006 | Semba et al. |
| 7,141,951 | B2 | | 11/2006 | Hosono et al. |
| 7,271,974 | B2 | * | 9/2007 | Fukuyama et al. ............ 360/75 |
| 2003/0214748 | A1 | * | 11/2003 | Fioravanti ..................... 360/75 |
| 2004/0114273 | A1 | * | 6/2004 | Fujiwara et al. .......... 360/97.02 |
| 2007/0217052 | A1 | | 9/2007 | Semba et al. |
| 2008/0310048 | A1 | * | 12/2008 | Hirono et al. ............ 360/97.02 |
| 2009/0300907 | A1 | * | 12/2009 | Akagi et al. ................... 29/737 |

FOREIGN PATENT DOCUMENTS

JP 2006-221806 8/2006

* cited by examiner

*Primary Examiner*—Andrew L Sniezek

(57) ABSTRACT

Embodiments of the present invention relate to a method for manufacturing a magnetic disk unit, the method including a step of writing servo data into the magnetic disk while introducing a low-density gas having a lower density than air into the enclosure. In one embodiment, the magnetic disk unit is comprised of a magnetic disk, a magnetic head, and a voice coil motor which are accommodated in the hermetically sealed enclosure. The enclosure has a gas inlet and a gas outlet, which are provided respectively with filters attached thereto.

19 Claims, 8 Drawing Sheets

Fig.2
(a)
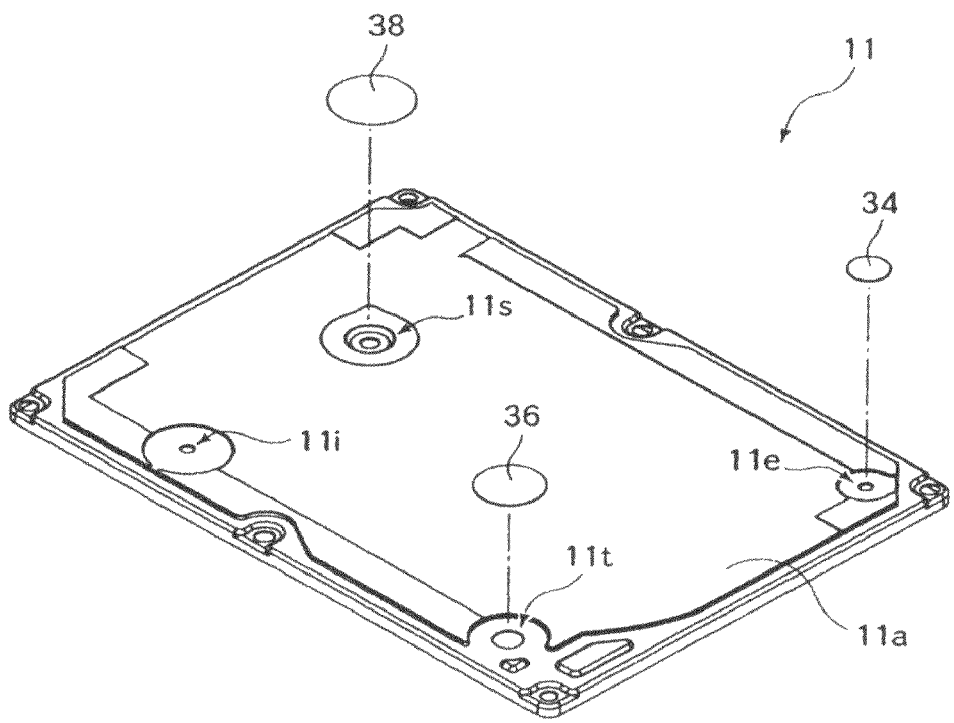
(b)
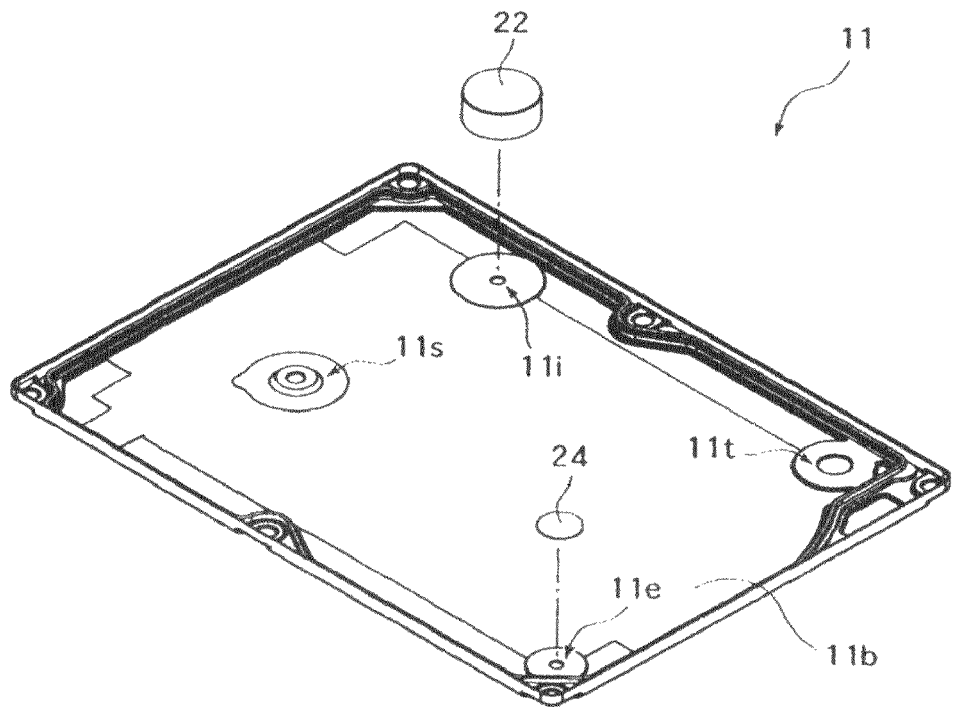

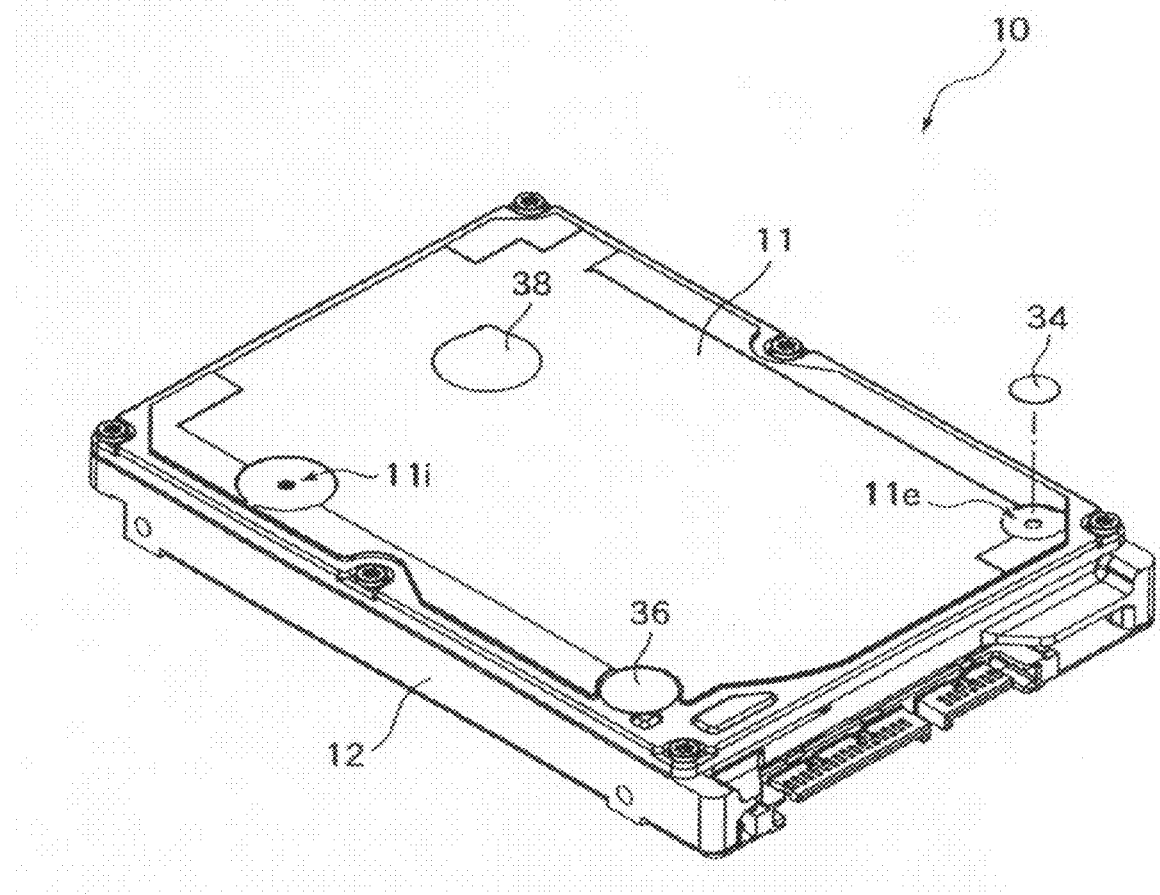

MAGNETIC DISK UNIT AND MANUFACTURING METHOD THEREOF

CROSS-REFERENCE TO RELATED APPLICATION

The instant nonprovisional patent application claims priority to Japanese Patent Application No. 2007-307058 filed on Nov. 28, 2007 and which is incorporated by reference in its entirety herein for all purposes.

BACKGROUND OF THE INVENTION

A magnetic disk unit, such as a hard disk, is provided with a magnetic disk which has a plurality of tracks concentrically arranged thereon, and each track has servo data written therein. The servo data contains address data and burst signals to be used for position control of the magnetic head.

One of the known methods for writing servo data is so-called self servo write (SSW), which writes servo data into the magnetic disk by controlling the magnetic head and actuator, which are accommodated in the enclosure, after the magnetic disk unit has been assembled.

The problem involved in recording servo data in a magnetic disk is that air flows produced by the rotating magnetic disk shake the support system of the magnetic head, thereby forming distorted tracks on the magnetic disk. The distorted tracks are a main cause that obstructs the positioning of the magnetic head.

Japanese Laid-open Patent No. 2006-40423 (Patent Document 1) discloses a technique to carry out self servo write while the enclosure is filled with helium which has been introduced from a gas inlet (hole) passing through the enclosure of the magnetic disk unit. The magnetic disk in the enclosure filled with helium experiences relatively little shaking and hence permits nearly round tracks to be formed because helium has a lower density than air.

Unfortunately, the technique disclosed in Patent Document 1 requires that introduction of helium should be carried out in an environment (such as clean room) with a high degree of air cleanliness in order to prevent particles from entering the enclosure through the gas inlet hole. This imposes restrictions on the manufacturing process.

BRIEF SUMMARY OF THE INVENTION

Embodiments of the present invention relate to a method for manufacturing a magnetic disk unit, the method including a step of writing servo data into the magnetic disk while introducing a low-density gas having a lower density than air into the enclosure. In the particular embodiment of FIG. 1, a magnetic disk unit 1 is comprised of the magnetic disk 2, the magnetic head 4, and the voice coil motor 7 which are accommodated in the hermetically sealed enclosure 10. The enclosure 10 has the gas inlet 11*i* and the gas outlet 11*e*, which are provided respectively with filters attached thereto.

BRIEF DESCRIPTION OF THE DRAWINGS

FIG. 2 is an exploded perspective view showing the lid as a constituent of the enclosure.

FIG. 8 is a diagram illustrating the step S16.

DETAILED DESCRIPTION OF THE INVENTION

Figure 1:
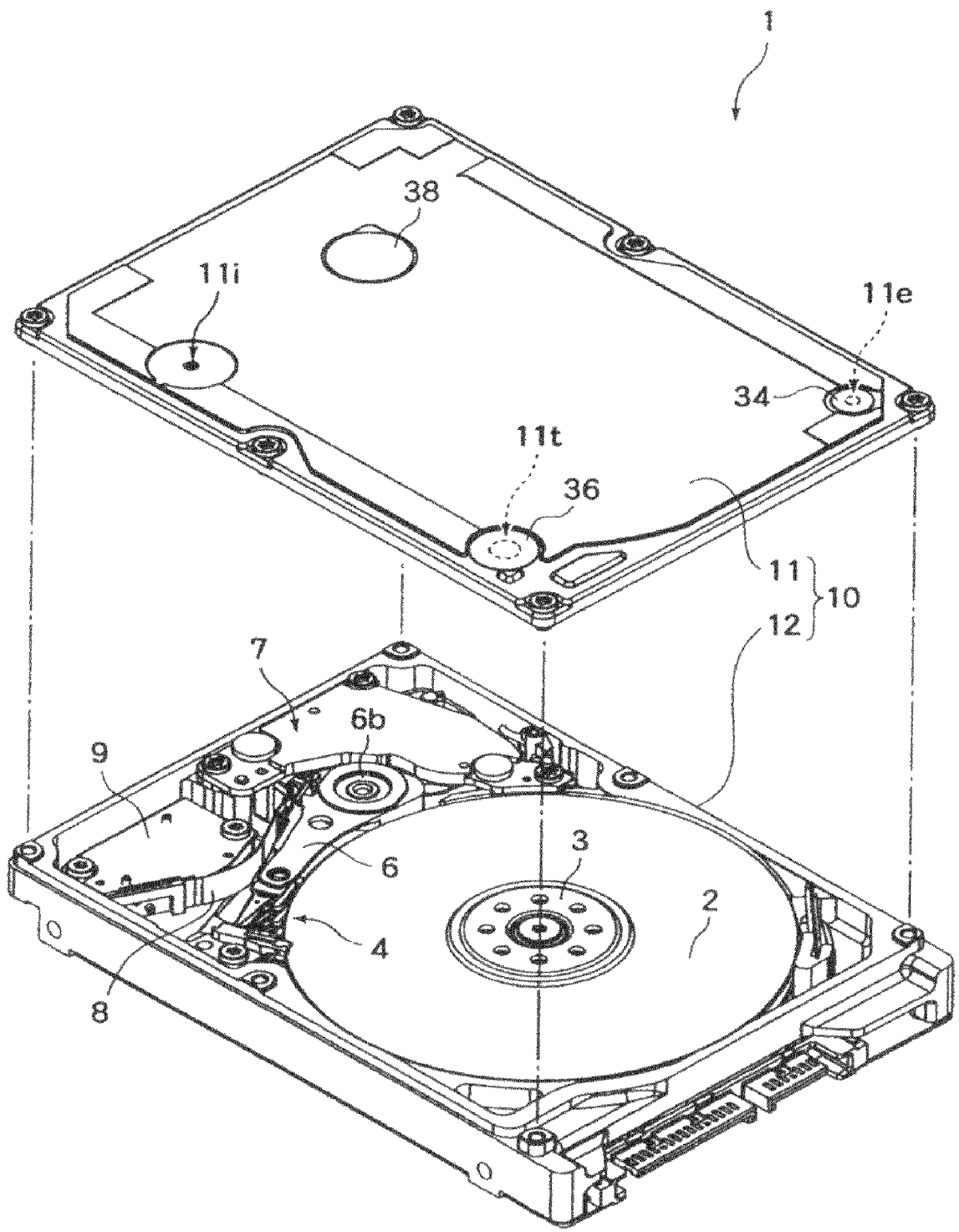
FIG. 1 is an exploded perspective view showing the magnetic disk unit pertaining to one embodiment of the present invention.

Embodiments of the present invention were completed in view of the foregoing. It is an object of embodiments of the present invention to provide a method for manufacturing a magnetic disk unit, the method permitting easy introduction of a low-density gas into the enclosure at the time of writing servo data into the magnetic disk.

Embodiments of the present invention relate to methods for manufacturing a magnetic disk unit comprised of a magnetic disk to store data, a magnetic head to write and read the data, and an actuator to move the magnetic head relative to the magnetic disk, which are accommodated in a hermetically sealed enclosure, the enclosure having a gas inlet and a gas outlet for communication between the inside and outside thereof, the gas inlet and gas outlet having respective filters attached thereto, wherein the method includes a step of filling the enclosure with a low-density gas having a lower density than air through the gas inlet and a step of writing servo data in the magnetic disk by controlling the magnetic head and the actuator both accommodated in the hermetically sealed enclosure.

According to one embodiment of the present invention, at least either of the filters attached respectively to the gas inlet and gas outlet is a breathing filter.

According to one embodiment of the present invention, the filter attached to the gas inlet excels the filter attached to the gas outlet, in its ability to filter off particles contained in a gas.

In an embodiment, the filter attached to the gas inlet is a breathing filter. In an embodiment, the gas outlet may be closed after servo data has been written in the magnetic disk.

According to one embodiment of the present invention, the filter attached to the gas outlet has a larger pressure loss than the filter attached to the gas inlet. In an embodiment, the gas outlet has a smaller diameter than the gas inlet. In an embodiment, the magnetic disk is kept rotating while the low-density gas is introduced into the hermetically sealed enclosure.

According to one embodiment of the present invention, at least either of the gas inlet and the gas outlet is temporarily closed until introduction of the low-density gas starts.

According to one embodiment of the present invention, any other gaps that communicate between the inside and the outside of the enclosure than the gas inlet and the gas outlet are closed until introduction of the low-density gas starts.

According to one embodiment of the present invention, at least either of the gas inlet and the gas outlet is temporarily closed while the servo data is being written in the magnetic disk.

According to one embodiment of the present invention, the filter attached to the gas inlet excels the filter attached to the gas outlet in ability to filter off particles contained in a gas, and the gas outlet may be temporarily closed after the low-density gas has been introduced into the hermetically sealed enclosure.

According to one embodiment of the present invention, air is introduced into the hermetically sealed enclosure through the gas inlet after servo data has been written in the magnetic disk.

According to an embodiment, the filter attached to the gas inlet excels the filter attached to the gas outlet in ability to filter off particles contained in a gas and the gas outlet may be closed after air has been introduced into the hermetically sealed enclosure.

According to one embodiment of the present invention, the low-density gas is helium.

Embodiments of the present invention relate to a magnetic disk unit having a magnetic disk to store data, a magnetic head to write and read the data, and an actuator to move the magnetic head relative to the magnetic disk, which are accommodated in a hermetically sealed enclosure, wherein the enclosure is characterized by having a gas inlet and a gas outlet for communication between the inside and outside thereof, the gas inlet and gas outlet having respective filters attached thereto.

According to one embodiment of the present invention, at least either of the filters attached respectively to the gas inlet and gas outlet is a breathing filter.

According to one embodiment of the present invention, at least either of the filters attached respectively to the gas inlet and gas outlet has a breathing filter and the other is closed.

According to one embodiment of the present invention, any other gaps that communicate between the inside and the outside of the enclosure than the gas inlet and the gas outlet are closed.

Embodiments of the present invention may relate to a magnetic disk unit having a magnetic disk to store data, a magnetic head to write and read the data, and an actuator to move the magnetic head relative to the magnetic disk, which are accommodated in a hermetically sealed enclosure, wherein the enclosure is characterized by having a breathing port which has a breathing filter, a testing port for particle test which has no filter and is closed, and an opening which has a filter and is closed.

According to embodiments of the present invention, the gas inlet and gas outlet passing through the enclosure are provided respectively with filters. This structure relaxes restrictions on the environment for introduction of helium and permits easy introduction of a low-density gas into the enclosure.

Embodiments of the present invention are described below with reference to the accompanying drawings.

FIG. 1 is an exploded perspective view showing the magnetic disk unit 1 pertaining to one embodiment of the present invention. The magnetic disk unit 1 has its components enclosed in the enclosure 10 (DE: Disk Enclosure), which is comprised of the rectangular boxlike base 12 with an open top and the platy lid 11 that closes the open top to make the enclosure 10 airtight.

The enclosure 10 accommodates the magnetic disk 2 and the head assembly 6 and other components. The magnetic disk 2 is attached to the spindle motor 3 placed on the bottom of the base 12. The magnetic disk 2 has concentric tracks (not shown) formed thereon. Each track has servo data written therein at a certain frequency. The servo data include address data and burst signals.

Next to the magnetic disk 2 is the head assembly 6, which has the magnetic head 4 supported at its forward end. The magnetic head 4 floats slightly above the rotating magnetic disk 2 to write and read data. The head assembly 6 also has the voice coil motor 7 attached to its rear end. The voice coil motor 7 swings the head assembly 6 to move the magnetic head 4 nearly in the radial direction of the magnetic disk 2.

The head assembly 6 also has the FPC (Flexible Printed Circuits) 8 attached thereto. The FPC 8 extends from the connector 9 placed on the bottom of the base 12 so as to electrically connect the circuit board (not shown) on the back of the base 12 with the magnetic head 4 and the voice coil motor 7.

FIG. 2 is an exploded perspective view showing the lid 11 as a constituent of the enclosure 10. FIG. 2(a) shows the front face 11a of the lid 11 and FIG. 2(b) shows the rear face 11b of the lid 11.

The lid 11 has the gas inlet 11i, the gas outlet 11e, the test port 11t, and the screw hole 11s formed therein, which permit communication between the inside and outside of the enclosure 10. Incidentally, the gas inlet 11i and the gas outlet 11e may be formed in the base 12.

The gas inlet 11i is a so-called breathing port, which prevents fluctuation of pressure difference between the inside and outside of the enclosure 10. It is also used to fill the enclosure 10 with a gas in the manufacturing process as mentioned later.

The gas inlet 11i has a flat cylindrical breathing filter 22 attached to the rear face 11b of the lid 11. To be specific, the breathing filter 22 is attached to the rear face 11b of the lid 11 in such a way as to close the gas inlet 11i. It filters a gas that enters the enclosure 10 and prevents particles contained therein from entering the enclosure 10.

Also, the gas inlet 11i is formed at a position where there is a space between the head assembly 6 and the connector 9 that accommodates the breathing filter 22 attached to the rear face 11b of the lid 11. (See FIG. 1.)

The gas outlet 11e is used to fill the enclosure 10 with a gas in the manufacturing process, as mentioned later. It has the filter 24 of flat unwoven fabric attached to the rear face 11b of the lid 11. It is also closed with the leak seal 34 attached to the front face 11a of the lid 11.

The test port 11t is used for testing in the manufacturing process as mentioned later. It is closed with the leak seal 36 attached to the front face 11a of the lid 11. Incidentally, it has no filter.

The screw hole 11s permits a screw to fasten the bearing 6b of the head assembly 6 through it. It is closed with the leak seal 38 attached to the front face 11a of the lid 11.

The breathing filter 22 for the gas inlet 11i excels the filter 24 for the gas outlet 11e in ability to filter off particles in a gas. Particles in a gas include those in the form of dust, moisture, chemical substance, and the like. The breathing filter 22 is comprised of a flat filter of nonwoven fabric (like the one used for the filter 24), spiral flow channels to extend the length of flow pass, activated carbon to adsorb moisture, and a chemical filter to adsorb chemical substances. Because of its ability to filter out various kinds of particles for a long period of time, the breathing filter 22 is superior to the filter 24.

Although the gas outlet 11e has the sheetlike filter 24 according to this embodiment, it may also be provided with a breathing filter similar to the breathing filter 22 so that it functions as the breathing port. In this case the gas outlet 11e does not need the leak seal 38.

Figure 3:
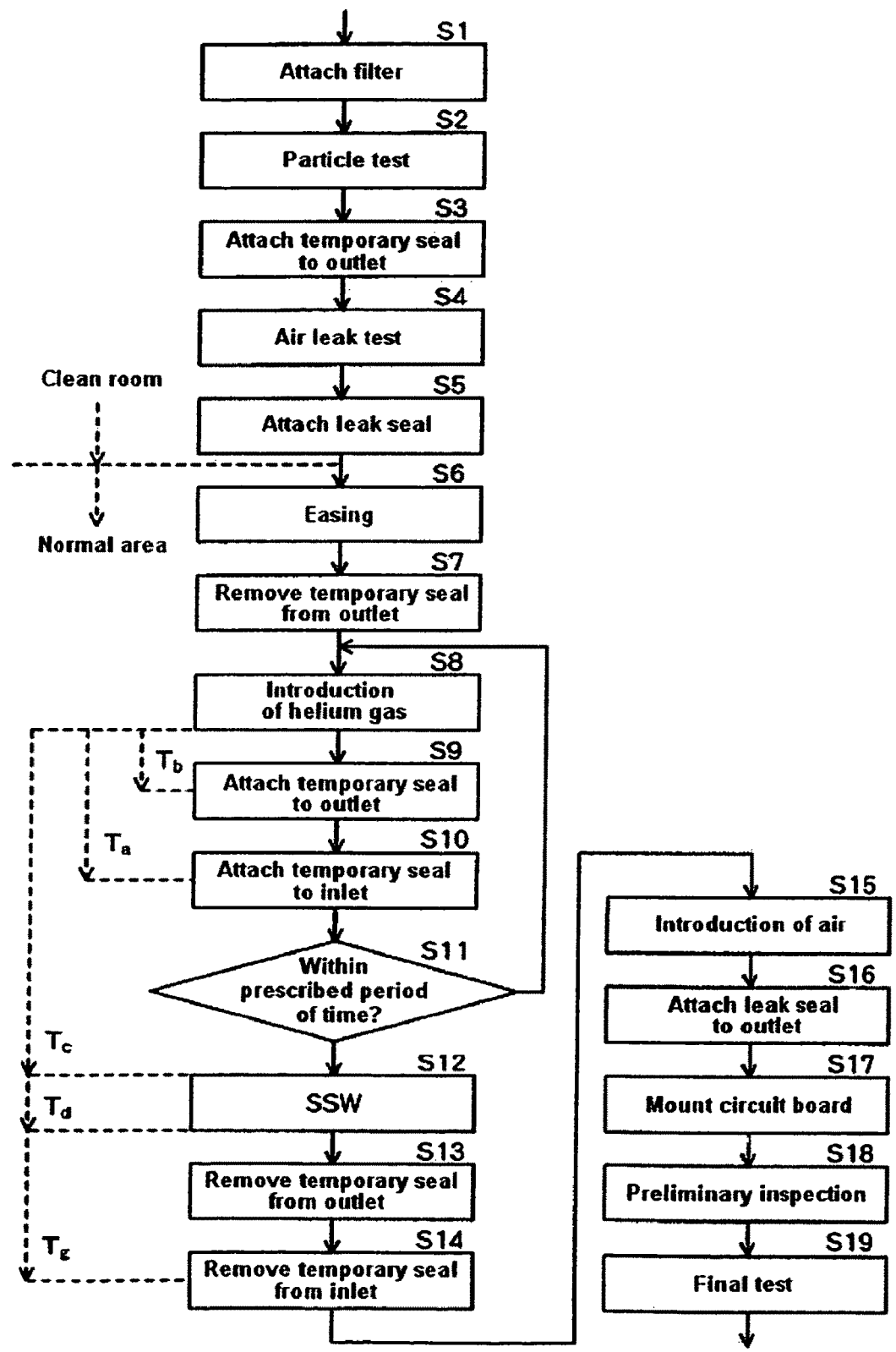
FIG. 3 is a flow sheet showing an example of the manufacturing process for the magnetic disk unit pertaining to one embodiment of the present invention.

FIG. 3 shows an example of the manufacturing process for the magnetic disk unit pertaining to one embodiment of the present invention. The manufacturing process mainly represents the steps of filling the enclosure 10 with helium and performing SSW (self servo write).

The steps S1 to S5 are carried out in a clean room. The step S1 is intended to attach the breathing filter 22 and the filter 24 to the rear face 11b of the lid 11. In other words, the rear face 11b of the lid 11 is provided with the breathing filter 22 and the filter 24 in such a way that they close the gas inlet 11i and the gas outlet 11e, respectively. The lid 11 having the breathing filter 22 and the filter 24 is fixed to the base 12 accommodating the magnetic disk 2 and the head assembly 6, so that the enclosure 10 is hermetically closed.

The step S2 is intended to test the hermetically sealed enclosure 10 for particles therein. To be specific, a detector is inserted into the enclosure 10 through the test port 11*t* to count the number of particles. Incidentally, unlike the gas inlet 11*i* and the gas outlet 11*e*, the test port 11*t* is not provided with any filter that prevents insertion of the detector. In addition, as compared with the gas inlet 11*i* and the gas outlet 11*e*, the test port 11*t* has a larger diameter to facilitate insertion of the detector.

Figure 4:
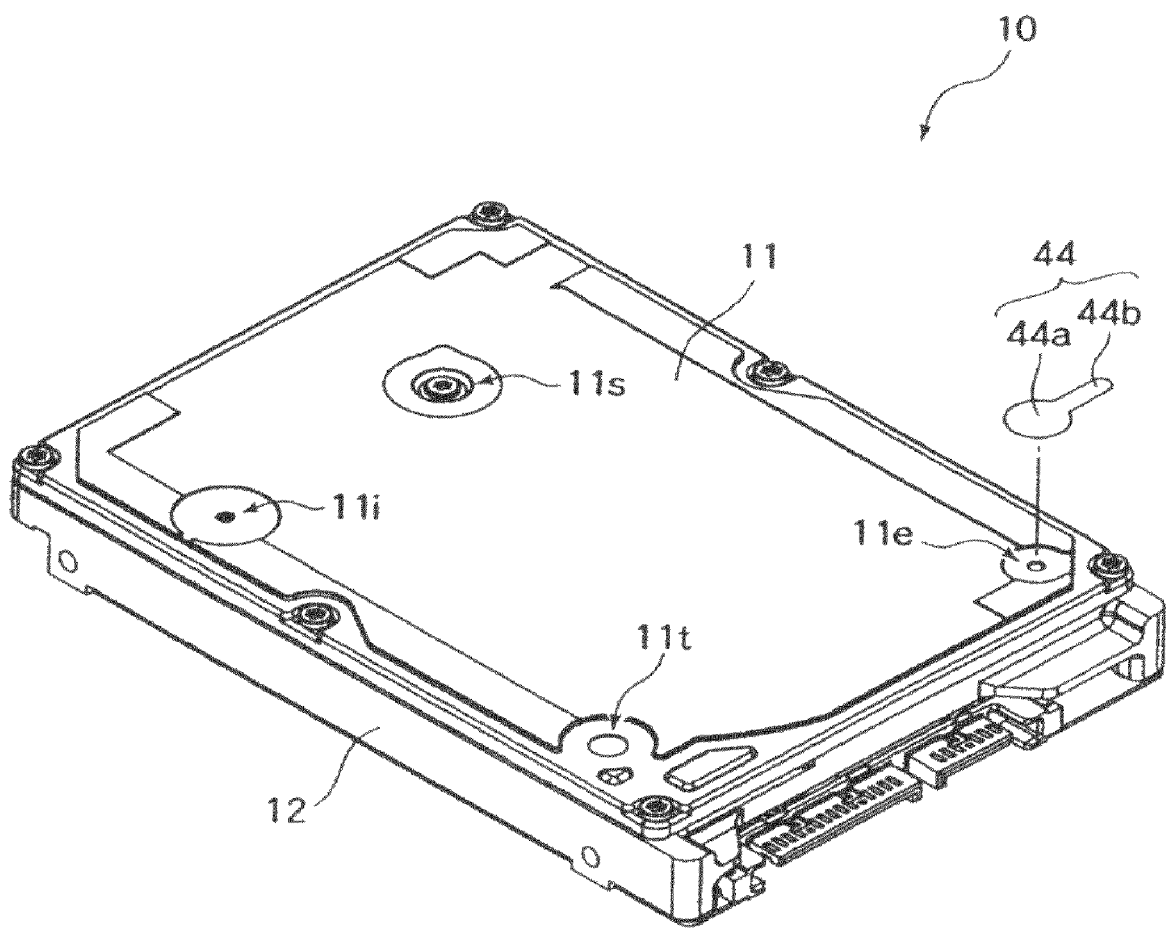
FIG. 4 is a diagram illustrating the step S3.

The step S3 is intended to attach a temporary seal 44 to temporarily close the gas outlet 11*e*, as shown in FIG. 4. The temporary seal 44 has the closing part 44*a*, which closes the gas outlet 11*e*, and the holding part 44*b* extending therefrom which facilitates peeling.

The temporary seal 44 minimizes the possibility of particles entering the enclosure 10 through the gas outlet 11*e* and the filter 24 before the step S8 (for helium introduction) mentioned later. Incidentally, the temporary seal 44 is not necessary if the filter 24 has a sufficient filtering power.

In this embodiment, the gas outlet 11*e* is closed because the filter 24 attached thereto is less capable than the breathing filter 22 attached to the gas inlet 11*i*. Moreover, both the gas outlet 11*e* and the gas inlet 11*i* may be temporarily closed.

The step S4 is intended to perform air leak test by introducing air through the test port 11*t*. This test makes sure that the enclosure 10 is completely air tight or free from air leakage.

Since the magnetic disk unit 1 (ready for shipment) has its gas outlet 11*e* closed with the leak seal 34 as shown in FIG. 1, temporarily closing the gas outlet 11*e* with the temporary seal 44 before the air leak test is equivalent to performing the air leak test under the same conditions as for the magnetic disk unit 1 ready for shipment.

Figure 5:
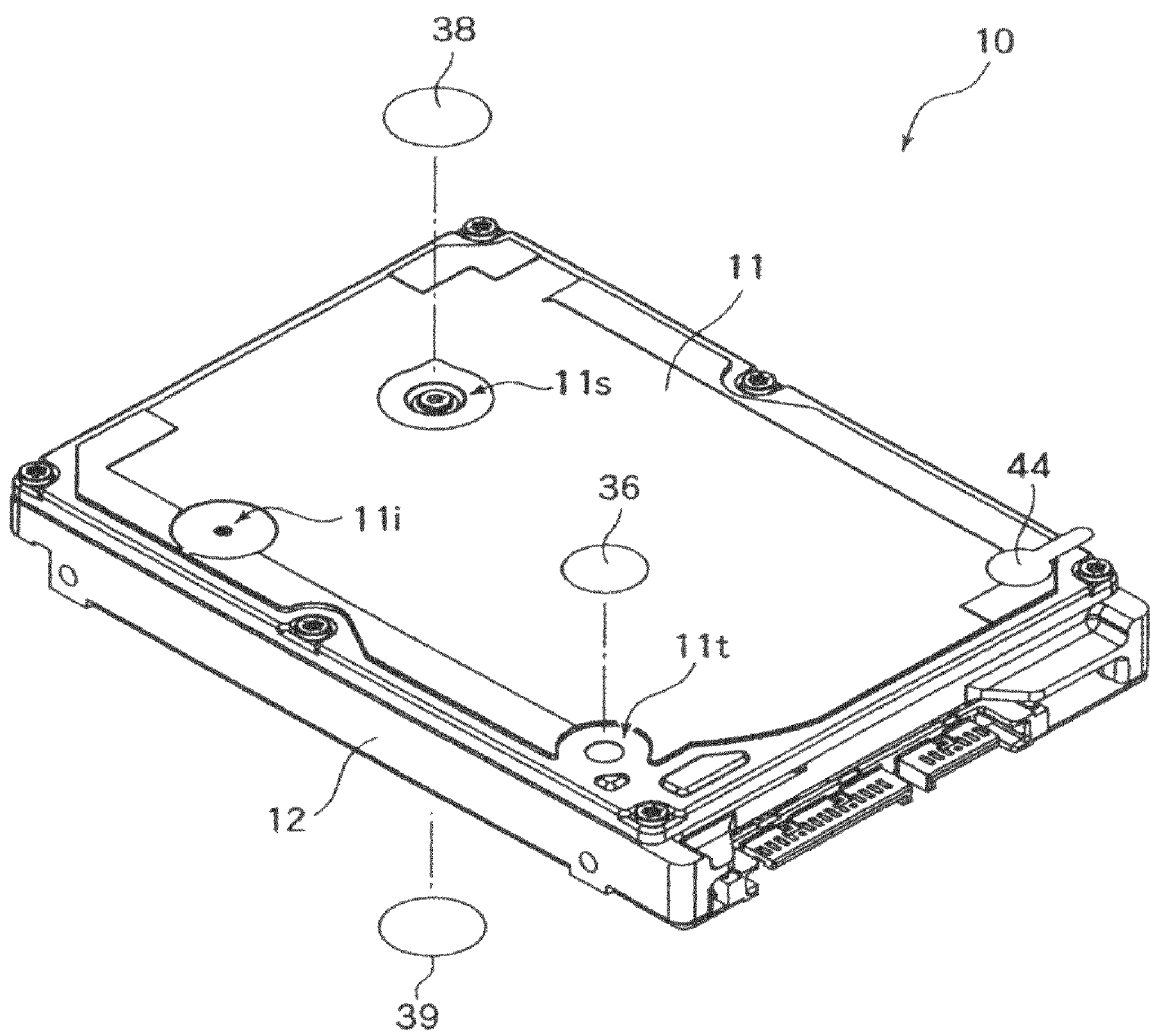
FIG. 5 is a diagram illustrating the step S5.

The step S5 is intended to close the test port 11*t*, the screw hole 11*s* formed in the lid 11, and the screw hole (not shown) formed in the rear face of the base 12 with the leak seals 36, 38, and 39, respectively, as shown in FIG. 5.

The screw hole 11*s* is closed in this step so that the enclosure 10 does not leak helium which has been introduced into the enclosure 10 in the step S8 (mentioned later) for helium introduction. Even though the previous step S4 (for air leak test) makes sure that air does not leak from the enclosure 10, there is the possibility that helium, which is introduced in the subsequent step S8, leaks from the enclosure 10 through a very small gap which air would not pass through, because molecular of helium is smaller than air. This problem is tackled by this step for closing any gap that might allow helium to leak. It is desirable to seal any gap between the base 12 and the lid 11.

According to an embodiment, the test port 11*t* cannot be used as an opening for introduction or discharging of a gas, which is mentioned later, because it should be used to check for particles and air leak after the enclosure 10 has been tightly closed as mentioned above.

After the foregoing steps S1 to S5 are completed, the enclosure 10 is removed from the clean room and transferred to a normal area where air cleanliness is not controlled. The subsequent steps S6 to S19 are carried out in this normal area.

The step S6 is intended to perform AC erasing thoroughly on the magnetic disk 2 accommodated in the enclosure 10. This step is carried out by using a special erasing apparatus.

The step S7 is intended to remove the temporary seal 44 (shown in FIG. 4) which closes the gas outlet 11*e*. This step is preliminary to the subsequent step S8 for helium introduction. Since the step S8 for helium introduction is carried out in a normal area, it is necessary to temporarily close the gas outlet 11*e* until the start of helium introduction. This minimizes the possibility of particles entering the enclosure 10 through the filter 24 and the gas outlet 11*e*.

The step S8 is intended to introduce helium into the hermetically sealed enclosure 10 through the gas inlet 11*i* and the gas outlet 11*e*. The enclosure 10 filled with helium is ready for self servo write. Although this embodiment employs helium as a gas with a lower density than air, helium many be replaced with hydrogen.

Figure 6:
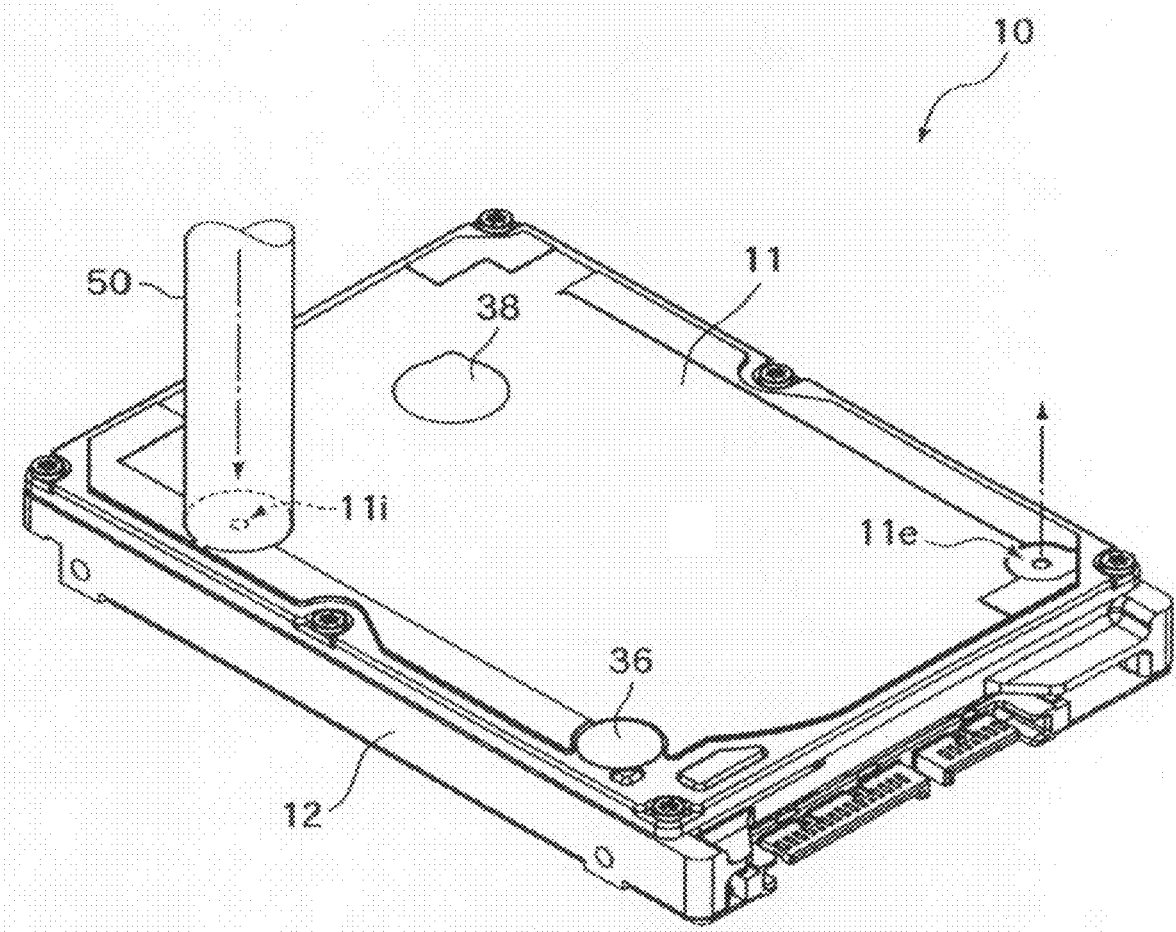
FIG. 6 is a diagram illustrating the step S8.

Introduction of helium may be accomplished by a gas introduction apparatus. To be specific, the nozzle 50 of the gas introduction apparatus is fitted to the gas inlet 11*i* as shown in FIG. 6, and helium is introduced into the enclosure 10 through the gas inlet 11*i*. The thus introduced helium pushes out the gas (mainly air) remaining in the enclosure 10 through the gas outlet 11*e*. In this way, air in the enclosure 10 is replaced with helium.

Helium introduction can be accomplished in a normal area because both the gas inlet 11*i* and the gas outlet 11*e* of the enclosure 10 are provided with the breathing filter 22 and the filter 24, respectively. In other words, it is not necessary to carry out helium introduction in an environment (such as clean room) with enhanced air cleanliness. This simplifies the manufacturing process.

Since the breathing filter 22 attached to the gas inlet 11*i* has a better filtering ability than the filter 24 attached to the gas outlet 11*e*, introduction of helium through the gas inlet 11*i* effectively prevents entrance of particles into the enclosure 10 even though particles are contained in helium being supplied from the gas introduction apparatus.

According to this embodiment, introduction of helium is accomplished by means of the nozzle 50 attached to the gas inlet 11*i*. However, it is also possible to attach another nozzle to the gas outlet 11*e* so that gas is extracted from the enclosure 10 through this nozzle. In this case it is easy to control the pressure in the enclosure 10. In addition, this arrangement is desirable because helium can be collected for recycling from the gas discharged form the gas outlet 11*e*.

The filter 24 attached to the gas outlet 11*e* should preferably have a larger pressure loss than the breathing filter 22 attached to the gas inlet 11*i*. In addition, the gas outlet 11*e* should preferably have a smaller diameter than the gas inlet 11*i*. This means that the gas passes through the gas outlet 11*e* more difficultly than the gas inlet 11*i* and hence the pressure in the enclosure 10 increases at the time of helium introduction. This provides a certain length of time until the temporary seals 42 and 44 are attached in the subsequent steps S9 and S10.

Introduction of helium gas in the step S8 is carried out while the magnetic disk 2 (accommodated in the enclosure 10) is being rotated by the externally driven spindle motor 3. The rotating magnetic disk 2 readily diffuses the helium gas (which has been introduced from the gas inlet 11*i*) throughout the enclosure 10, thereby helping effective filling of helium gas.

For introduction of helium, which is carried out while the magnetic disk 2 is rotating, the gas inlet 11*i* and the gas outlet 11*e* may be provided along the edge of the magnetic disk 2 because the gas in the enclosure flows along the periphery of the magnetic disk 2 in its rotating direction. For complete diffusion of helium (introduced through the gas inlet 11*i*) in the enclosure 10, the gas inlet 11*i* and the gas outlet 11*e* may be provided at a certain distance apart in the direction of rotation of the magnetic disk 2. Thus, according to this embodiment, the gas inlet 11*i* and the gas outlet 11*e* are provided at positions which are mutually opposite, with the magnetic disk 2 in between.

At the time of helium introduction, with the magnetic disk 2 rotating, it is possible to know the concentration of helium in the enclosure 10 from the magnitude of current being supplied to the spindle motor 3. As the concentration of helium in the enclosure 10 increases, resistance to the rotating magnetic disk 2 decreases, which leads to a decrease in current to drive the spindle motor 3 at a prescribed speed. Therefore, the magnitude of current being supplied to the spindle motor 3 can be used as an index that denotes the concentration of helium in the enclosure 10.

Figure 7:
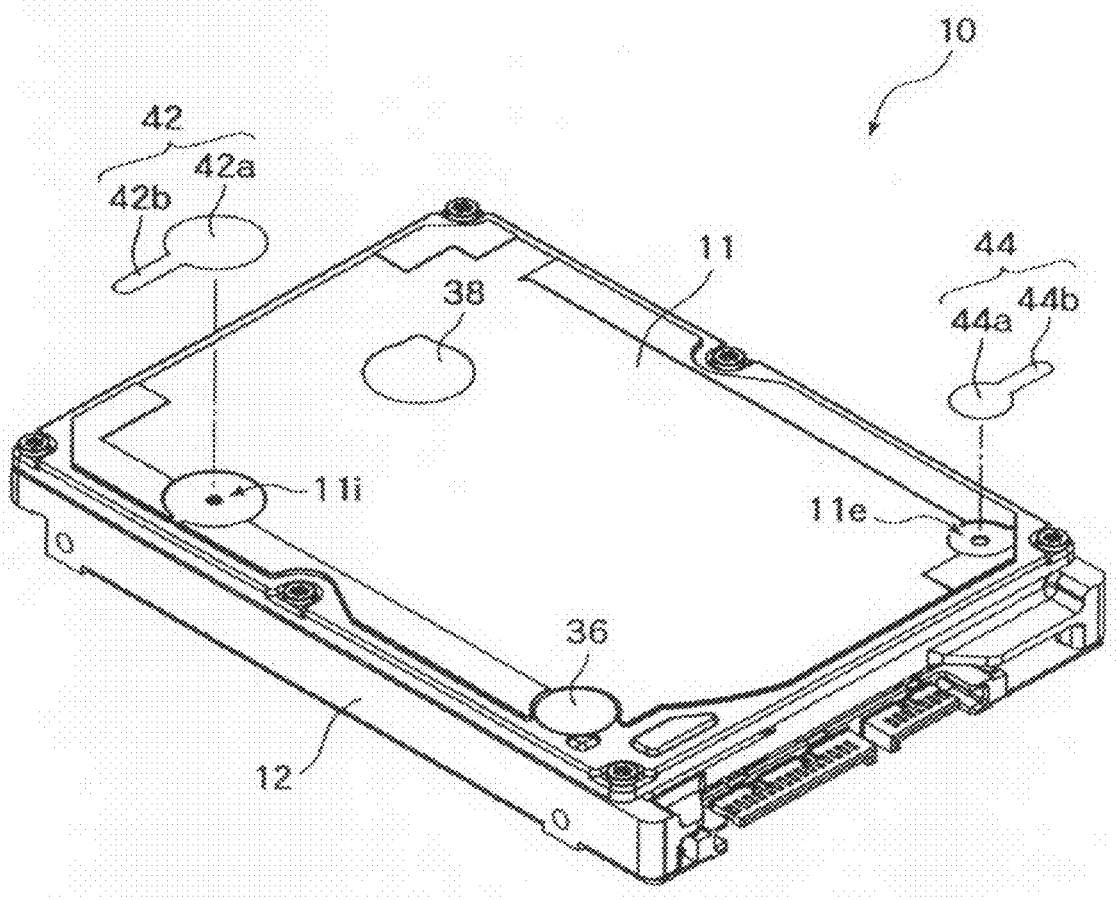
FIG. 7 is a diagram illustrating the steps S9 and S10.

After the step S8 for helium introduction is completed, the steps S9 and S10 start, in which the temporary seals 42 and 44 are attached (as shown in FIG. 7) to temporarily close the gas inlet 11*i* and the gas outlet 11*e* to prevent helium from leaking from the enclosure during the step S12 for self servo write.

The temporary seal 44 to close the gas outlet 11*e* is attached before the temporary seal 42 to close the gas inlet 11*i* is attached. (That is, $T_b < T_a$; $T_a$, $T_b$ are defined in FIG. 3) This is because the filter 24 for the gas outlet 11*e* is less resistant to leakage than the breathing filter 22 for the gas inlet 11*i*.

The temporary seals 42 and 44 may be attached within $T_a$ and $T_b$, which are shorter than a prescribed length of time ($T_e$), after helium has been introduced into the enclosure 10. $T_e$ is defined as a length of time required for the concentration of helium in the enclosure 10 to decrease below a permissible range if the gas inlet 11*i* and the gas outlet 11*e* are not closed after helium introduction into the enclosure 10. In the case where $T_a$ and $T_b$ exceed $T_e$, the step S11 goes back to the step S8, in which helium is introduced again.

The step S12 is intended to write servo data in the magnetic disk 2 or to perform so-called self servo write (SSW) by externally controlling the magnetic head 4 and the voice coil motor 7 accommodated in the hermetically sealed enclosure 10.

The magnetic head 4 and the voice coil motor 7 are controlled by the external servo data recording apparatus through the connector 9 and the FPC 8 in the enclosure 10. To be specific, the servo data recording apparatus supplies the magnetic head 4 with servo data to be written in the magnetic disk 2. It also acquires servo data which the magnetic head 4 reads out of the magnetic disk 2. Further, in response to servo data acquired, it generates and outputs drive signals for the voice coil motor 7.

The writing of servo data proceeds to form a new track as the magnetic head 4 follows the previously formed track due to the fact that the recording and playback elements carried by the magnetic head 4 are displaced in the radial direction of the magnetic disk 2. In other words, the playback element reads out servo data from the previously formed track and the acquired servo data causes the magnetic head 4 to follow the track. Then the recording element writes the servo data to form a new track. The procedure to form another new track continues in the radial direction of the magnetic disk 2.

The foregoing procedure forms tracks (with nearly complete roundness and little distortion) on the magnetic disk 2 because the enclosure 10 is filled with helium by the step S8 for helium introduction.

Since the gas inlet 11*i* and the gas outlet 11*e* of the enclosure 10 are provided respectively with the breathing filter 22 and the filter 24 and are also closed respectively with the temporary seals 42 and 44, leakage of helium from the enclosure 10 is suppressed. As the result, self servo write can be accomplished while the enclosure 10 is placed in a normal area.

In addition, since the step S8 for helium introduction is also carried out in a normal area as mentioned above, it is possible to reduce time from the introduction of helium to the start of self servo write. As the result, it is possible to perform self servo write while the concentration of helium still remains high in the enclosure 10.

Time ($T_c + T_d$) from the introduction of helium into the enclosure 10 to the completion of self servo write should not exceed the prescribed time $T_f$ which is defined as time for the concentration of helium in the enclosure 10 to decrease below the permissible range when the gas inlet 11*i* and the gas outlet 11*e* are closed after helium has been introduced into the enclosure 10.

After the step S12 for self servo write is completed, the temporary seals 42 and 44 are removed from the gas inlet 11*i* and the gas outlet 11*e* in the steps S13 and S14.

Time ($T_c + T_d + T_g$) from the introduction of helium into the enclosure 10 to the completion of self servo write and the removal of the temporary seals 42 and 44 should not exceed the prescribed time $T_h$ which is defined as time for helium to begin to leak from the enclosure 10 and change to occur in components after the introduction of helium into the enclosure 10. Change in components due to leakage of helium from the enclosure 10 means deformation of the lid 11 caused by pressure decrease in the enclosure 10 or degradation of grease in sliding parts.

The step S15 is intended to introduce air into the hermetically sealed enclosure 10 through the gas inlet 11*i* and the gas outlet 11*e*. This step can be carried out in the same way as the step S8 mentioned above. The step S12 for self servo write is followed by the step S15 for air introduction into the enclosure 10 in order that the subsequent step S18 for preliminary test and the step S19 for final test are carried out under the same conditions as those under which the magnetic disk unit 1 (ready for shipment) is tested.

When air is introduced into the enclosure 10 through the gas inlet 11*i*, helium is discharged from the enclosure 10 through the gas outlet 11*e*. Therefore, it is desirable to collect and recycle the discharged helium.

The step S16 is intended to close the gas outlet 11*e* by attaching the leak seal 34 thereto. The leak seal 34 prevents particles from entering the enclosure 10 through the gas outlet 11*e* after the magnetic disk unit 1 is made ready for shipment. In this embodiment, the gas outlet 11*e* is closed by the filter 24 attached thereto which is inferior in filtering power to the breathing filter 22 attached to the gas inlet 11*i*.

The magnetic disk unit 1 is completed by the final steps S17 (for attachment of a circuit board to the rear side of the enclosure 10), S18 (for preliminary test), and S19 (for final test).

What is claimed is:

1. A method for manufacturing a magnetic disk unit comprising a magnetic disk to store data, a magnetic head to write and read said data, and an actuator to move said magnetic head relative to said magnetic disk, which are accommodated in a hermetically sealed enclosure, said enclosure having a gas inlet and a gas outlet for communication between the inside and outside thereof, said gas inlet and gas outlet having respective filters attached thereto, wherein said method includes:

filling said enclosure with a low-density gas having a lower density than air through said gas inlet; and writing servo data in said magnetic disk by controlling said magnetic head and said actuator both accommodated in said hermetically sealed enclosure; and the filter attached to said gas inlet excels the filter attached to said gas outlet in ability to filter off particles contained in a gas.

2. The method for manufacturing a magnetic disk unit as defined in claim 1, wherein one of the filters attached respectively to said gas inlet and gas outlet, is a breathing filter.

3. The method for manufacturing a magnetic disk unit as defined in claim 1, wherein said gas outlet is closed after servo data has been written in said magnetic disk.

4. The method for manufacturing a magnetic disk unit as defined in claim 1, wherein the filter attached to said gas outlet has a larger pressure loss than the filter attached to said gas inlet.

5. The method for manufacturing a magnetic disk unit as defined in claim 1, wherein said gas outlet has a smaller diameter than said gas inlet.

6. The method for manufacturing a magnetic disk unit as defined in claim 1, wherein said magnetic disk is kept rotating while said low-density gas is introduced into said hermetically sealed enclosure.

7. The method for manufacturing a magnetic disk unit as defined in claim 1, wherein at least one of said gas inlet and said gas outlet is temporarily closed until introduction of said low-density gas starts.

8. The method for manufacturing a magnetic disk unit as defined in claim 1, wherein any other gaps that communicate between the inside and the outside of said enclosure than said gas inlet and said gas outlet are closed until introduction of said low-density gas starts.

9. The method for manufacturing a magnetic disk unit as defined in claim 1, wherein at least one of said gas inlet and said gas outlet is temporarily closed while said servo data is being written in said magnetic disk.

10. The method for manufacturing a magnetic disk unit as defined in claim 9, wherein:
said gas outlet is temporarily closed after said low-density gas has been introduced into said hermetically sealed enclosure.

11. The method for manufacturing a magnetic disk unit as defined in claim 1, wherein air is introduced into said hermetically sealed enclosure through said gas inlet after servo data has been written in said magnetic disk.

12. The method for manufacturing a magnetic disk unit as defined in claim 11, wherein said gas outlet is closed after air has been introduced into said hermetically sealed enclosure.

13. A magnetic disk unit comprising:
a magnetic disk to store data,
a magnetic head to write and read said data,
an actuator to move said magnetic head relative to said magnetic disk, wherein the magnetic disk, the magnetic head, and the actuator are accommodated in a hermetically sealed enclosure,
wherein said enclosure is characterized by having a gas inlet and a gas outlet for communication between the inside and outside thereof, said gas inlet and gas outlet having respective filters attached thereto; and
the filter attached to said gas inlet excels the filter attached to said gas outlet in ability to filter off particles contained in a gas.

14. The magnetic disk unit as defined in claim 13, wherein at least one of the filters attached respectively to said gas inlet or gas outlet is a breathing filter.

15. The magnetic disk unit as defined in claim 13, wherein at least one of the filters attached respectively to said gas inlet and gas outlet has a breathing filter, and the other is closed.

16. The magnetic disk unit as defined in claim 13, wherein any other gaps that communicate between the inside and the outside of said enclosure than said gas inlet and said gas outlet are closed.

17. A method for manufacturing a magnetic disk unit comprising a magnetic disk to store data, a magnetic head to write and read said data, and an actuator to move said magnetic head relative to said magnetic disk, which are accommodated in a hermetically sealed enclosure, said enclosure having a gas inlet and a gas outlet for communication between the inside and outside thereof, said gas inlet and gas outlet having respective filters attached thereto, wherein said method includes:
filling said enclosure with a low-density gas having a lower density than air through said gas inlet, and rotating the magnetic disk while said low-density gas is introduced into said hermetically sealed enclosure;
writing servo data in said magnetic disk by controlling said magnetic head and said actuator both accommodated in said hermetically sealed enclosure; and
the gas outlet is closed after servo data has been written in said magnetic disk, and the filter attached to said gas outlet has a larger pressure loss than the filter attached to said gas inlet.

18. The method for manufacturing a magnetic disk unit as defined in claim 17, wherein said gas outlet has a smaller diameter than said gas inlet, and at least one of said gas inlet and said gas outlet is temporarily closed until introduction of said low-density gas starts.

19. The method for manufacturing a magnetic disk unit as defined in claim 17, wherein:
at least one of said gas inlet and said gas outlet is temporarily closed while said servo data is being written in said magnetic disk;
said gas outlet is temporarily closed after said low-density gas has been introduced into said hermetically sealed enclosure;
air is introduced into said hermetically sealed enclosure through said gas inlet after servo data has been written in said magnetic disk; and
said gas outlet is closed after air has been introduced into said hermetically sealed enclosure.

\* \* \* \* \*